United States Patent [19]

Dorai et al.

[11] Patent Number: 5,282,929
[45] Date of Patent: Feb. 1, 1994

[54] REDUCING MOLECULAR WEIGHT DISTRIBUTION OF POLYETHER GLYCOLS BY SHORT-PATH DISTILLATION

[75] Inventors: Suriyanarayan Dorai, Lockport, N.Y.; Frank L. Rawling, Jr., Newark, Del.; James A. Schultz, Swedesboro, N.J.

[73] Assignee: E. I. Du Pont de Nemours and Company, Wilmington, Del.

[21] Appl. No.: 944,995

[22] Filed: Sep. 15, 1992

Related U.S. Application Data

[63] Continuation-in-part of Ser. No. 847,466, Mar. 6, 1992, abandoned.

[51] Int. Cl.⁵ .......................... B01D 3/10; C07C 41/38
[52] U.S. Cl. .......................... 203/91; 159/49; 159/DIG. 16; 203/89; 568/617; 568/621
[58] Field of Search .......................... 203/91, 89, 72, 73; 568/617, 621; 202/205; 159/49, DIG. 16, 6.2, DIG.8

[56] References Cited

U.S. PATENT DOCUMENTS

| | | | |
|---|---|---|---|
| 4,568,775 | 2/1986 | Aoshima et al. | 568/617 |
| 4,585,592 | 4/1986 | Mueller | 568/617 |
| 4,686,273 | 8/1987 | Harris | 525/462 |
| 4,762,951 | 8/1988 | Mueller | 568/617 |
| 4,904,745 | 2/1990 | Inoue et al. | 568/616 |
| 4,933,503 | 6/1990 | Mueller | 568/617 |
| 5,053,553 | 10/1991 | Dorai | 568/621 |

FOREIGN PATENT DOCUMENTS

| | | | |
|---|---|---|---|
| 0541342 | 6/1957 | Canada | 568/617 |
| 58-83028 | 2/1983 | Japan | 568/617 |
| 60-42421 | 5/1985 | Japan | 568/617 |
| 108424 | 5/1985 | Japan | 568/617 |

Primary Examiner—Virginia Manoharan
Attorney, Agent, or Firm—Charles E. Feeny

[57] ABSTRACT

Polyether glycols, especially poly(tetramethylene ether) glycol (PTMEG) having a narrow molecular weight distribution of about 1.90 to 2.07, or dispersity of 1.50 to 1.90, are made by a process wherein the low molecular weight fraction in unit operations using at least one short-path distillation evaporator. In these units, PTMEG is subjected to temperatures in the range of 150°–190°C. with the hold-up time varying between 10–200 seconds. The required vacuum to force the separation of the low molecular weight PTMEG varies between 0.001 mm and 1.0 mbar. PTMEG residue from the distillation unit is also characterized by its low water content and low concentration of oligomeric cyclic ethers.

5 Claims, 1 Drawing Sheet

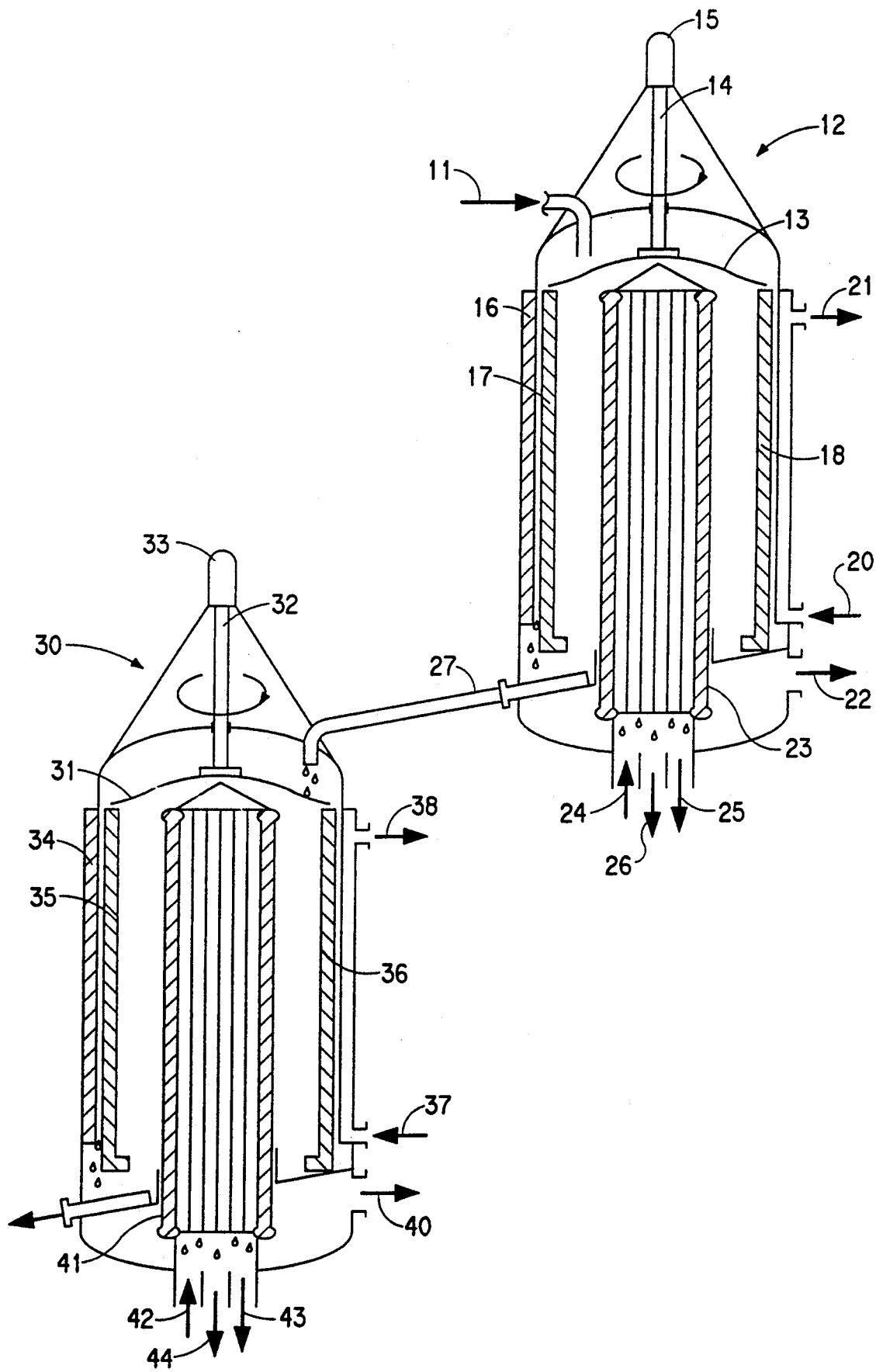

though the low molecular weight (LMW) fraction can easily be washed out of the polymer, the environmental and energy costs associated with a wash step are prohibitive.

REDUCING MOLECULAR WEIGHT DISTRIBUTION OF POLYETHER GLYCOLS BY SHORT-PATH DISTILLATION

CROSS-REFERENCE TO RELATED APPLICATION

This application is a continuatin-in-part of U.S. Ser. No. 07/847,466 filed Mar. 6, 1992, now abandoned.

FIELD OF THE INVENTION

The present invention relates to a process for reducing the molecular weight distribution or the polydispersity of polyether glycols, particularly poly(tetramethylene ether) glycols, by short-path distillation to separate lower molecular weight fractions at low pressure and elevated temperatures.

RELATED ART

The present invention relates to a process for preparing a narrow molecular weight distribution (NMWD) poly(tetramethylene ether) glycol (PTMEG), and, more particularly, to an improved batchwise or continuous distillation removal of low molecular weight species in a short-path distillation system.

U.S. Pat. No. 4,933,503 (Mueller to BASF) discloses a process for narrowing the molecular weight distribution of polytetrahydrofuran and of copolymers of tetrahydrofuran and alkylene oxides by distilling off the low molecular weight fractions at pressures of less than 0.3 mbar at 200° to 260° C. The residue from the distillation is mixed with a three component solvent system which can form three separate phases each containing a narrow weight distribution polymer.

U.S. Pat. No. 3,925,484 (Baker to Du Pont) claims a process for producing PTMEG having a narrow molecular weight distribution of about 1.3–1.7 by partially depolymerizing the PTMEG at a temperature from about 120°–150° C. The lower molecular weight fractions in this case are converted most rapidly to tetrahydrofuran (THF) by the partial depolymerizing process. Even though the process produces narrow molecular weight distributed PTMEG, conversion of substantial amount of polymer to lower cost THF restricts the use of this technique.

U.S. Pat. No. 4,585,592 (Mueller to BASF) describes a process for reducing the content of oligomeric cyclic ethers (OCE) in a polyoxybutylene/polyoxyalkylene glycol wherein a copolymer, obtained by copolymerization of tetrahydrofuran with a 1,2-alkylene oxide in the presence of a compound containing reactive hydrogen under the catalytic action of a bleaching earth, is subjected to distillation at an elevated temperature and under reduced pressure, the improvement which comprises: treating the copolymer, prior to said distillation, with oxygen or an oxygen-containing gas at a temperature of from 20° to 110° C.; and then carrying out the distillation under reduced pressure at a temperature above 200° C., and preferably from 210° to 250° C.

The product from a tetrahydrofuran/propylene oxide copolymer after removing residual monomers and treating with air at 80° C., was charged to a rotary evaporator and heated at 220° C. and under 2 mbar pressure. Then distillate (7% by weight) consisted mainly (80%) of volatile oligomeric cyclic ethers), whose rings contained 1 to 3 oxypropyl or oxybutyl groups. Note that the PTMEG process is run with precautions to exclude air. The reason for this is that terminal hydroxyl groups are lost by oxidation to carboxylic acid groups, and the customer would find these unacceptable for their polymer use. Column 3, lines 25–35 comments on the instability of commercial polytetramethylene ether glycols above 210° C.

Use of polymeric catalysts for polymerization of tetrahydrofuran are also reported. U.S. Pat. No. 4,163,115 (Heinsohn, et al. to Du Pont) disclosed that the molecular weight of PTMEG, when using a catalyst which is a fluorinated resin containing sulfonic acid end groups, can be controlled by adding an acylium ion precursor to the reaction medium. Typically, the acylium ion precursors are anhydrides of carboxylic acids. Acetic anhydride is commonly used for this purpose. Several other solid non-hydrolyzable and recyclable catalysts are also reported. The reaction product is an ester of capped PTMEG which is conveniently reacted with an alkanol (methanol) to provide the final product PTMEG and yielding methyl acetate as a by-product. The molecular weight distribution parameters of PTMEG produced in this manner is similar to the unwashed PTMEG produced by using the fluorosulfonic acid (FSA) catalyzed polymerization process, namely:

Dispersity = 2.0–2.1

MWR = 2.3–2.6

Even though the low molecular weight (LMW) fraction can easily be washed out of the polymer, the environmental and energy costs associated with a wash step are prohibitive.

Poly(tetramethylene ether) glycols having molecular weight distributions (MWD) of 1.1 to 1.4 by this process are claimed.

SUMMARY OF THE INVENTION

The present invention is an improved process for preparing PTMEG having a molecular weight between about 400 and about 4000, and having a dispersity between about 1.2 and 1.8. The process utilizes a starting material comprising PTMEG having an average molecular weight between about 400 and about 3000, and having a dispersity between about 1.9 and 2.3.

BRIEF DESCRIPTION OF THE DRAWING

The Figure is a simplified process flow diagram which illustrates the major components of the process of the invention and their interconnection.

DETAILED DESCRIPTION OF THE DRAWING

The Figure depicts a two stage short path evaporation system. The feed PTMEG is fed at 11 to a first stage short path evaporator depicted generally at 12. The PTMEG feed drips onto product distributor plate 13 rotated by shaft 14 connected to gear motor 15. The PTMEG feed is flung by centrifugal force against the interior wall of heater jacket 16 and flows downwardly along the heater jacket 16. The interior wall of heater jacket 16 is continuously wiped with roller wipers depicted at 17 and 18. Generally three sets of rollers are used each set mounted on a shaft driven in an annular path by product distribution plate 13. The rollers serve to insure that a thin film of the desired thickness is maintained on the interior wall of heater jacket 16. Heater cycle fluid is feed at 20 to the interior of heater jacket 16 and removed at 21 to maintain the desired temperature on the interior wall of heater jacket 16. An exhaust vacuum is drawn at 22, by means not shown, to maintain the desired pressure inside the first stage of the short path evaporator 12. Internal condenser 23 is fed with cooling water at 24 and the cooling water is discharged at 25 to maintain internal condenser 23 at the desired temperature. The distillate which condenses on internal condenser 23 is removed at 26. The PTMEG residue which flows down the interior wall of heater jacket 16 is collected and discharged at 27.

The residue discharge line 27 is connected to a second short path evaporator depicted generally at 30. The PTMEG residue drips onto product distributor place 31 rotated by shaft 32 connected to gear motor 33. The residue PTMEG is flung by centrifugal force against the interior wall of heater jacket 34 and flows downwardly along the heater jacket 34. The interior wall of heater jacket 34 is continuously wiped with roller wipers depicted at 35 and 36. Again three sets of rollers are generally used with each shaft driven in an annular path by product distribution plate 31. Again the rollers serve to insure that a thin film of the desired thickness is maintained on the interior wall of heater jacket 34. Heater cycle fluid is fed at 37 to the interior of heater jacket 34 and removed at 38 to maintain the desired temperature on the interior wall of heater jacket 34. An exhaust vacuum is drawn at 40, by means not shown, to maintain the desired pressure inside the second stage of the short path evaporator 30. Internal condenser 41 is fed with cooling water at 42 and the cooling water is discharged at 43 to maintain internal condenser 41 at the desired temperature. The distillate which condenses on internal condenser 41 is removed at 44. The PTMEG residue (Product) which flows down the interior wall of heater jacket 34 is collected and discharged at 45.

The type of short path distillation apparatus depicted in the drawings enables the use of very low pressures which are essential to the success of the process of the present invention. In a single stage short path distillation apparatus evaporative pressures of 0.001 to 1.0 mbar were used. In the preferred two stage system using two short path distillation apparatus connected in series evaporative pressures in the final short path distillation apparatus is preferably in the range of 0.001 to 0.01 mbar which provides a narrow number average weight distribution corresponding to a dispersity in the range of 1.2 to 1.8 and preferably 1.25 to 1.40. Generally the temperatures used in the short path distillation apparatus will be from 140° to 190° C. with 160° to 180° C. being the preferred range.

DETAILED DESCRIPTION OF THE INVENTION

Certain terms, which are typical molecular weight distribution parameters and whose meanings are set out below, are used herein to describe the invention:

Number Average Molecular Weight ($Mn$)

$$Mn = \frac{\text{Sum of } (Wi) \text{ for All } i \text{ Values}}{\text{Sum of } (Wi/Mi)} \quad (1)$$

where:
Wi is the weight of the "i" the polymer species/oligomer, and
Mi is the molecular weight of the "i" the polymer species/oligomer.
Mn is determined by end group analysis by titration.

Number Average Molecular Weight ($Mw$)

-continued $$Mw = \frac{\text{Sum of } (Wi)(Mi) \text{ for All } i \text{ Values}}{\text{Sum of } (Wi) \text{ for All } i \text{ Values}}$$

Mw is determined by gel permeation Chromatography or liquid chromatography.

Dispersity/Polydispersity ($Mw/Mn$)

Dispersity or polydispersity, used herein interchangeably, is a universally accepted measure of molecular weight distribution, or MWD. The lower the value of dispersity, the narrower is the molecular weight distribution for the PTMEG sample under consideration.

Molecular Weight Ratio (MWR)

Molecular weight ratio (MWR) is another measure of broadness of molecular weight distribution and is related to the melt viscosity of the polymer as follows:

$$MWR = \frac{(1160)(n)(0.493)}{Mn} \quad (2)$$

where:
n is melt viscosity in poise, and Mn is number average molecular weight as defined in equation (1), and is determined by end group analysis by titration.

PTMEG is made commercially by polymerizing anhydrous THF in the presence of strong acid catalysts. Most commercial plants use fluorosulfonic acid (FSA) as the catalyst. When using FSA as the catalyst, the polymer produced in the polymerization reactor is believed to be the sulfate ester of PTMEG which is hydrolyzed with water to obtain higher, more economic yields of the polyol product. Unreacted THF is removed from the resultant aqueous polymer dispersion by conventional steam stripping. The acidic aqueous dispersion of impure PTMEG is then subjected to washing with water. The purpose of the washing is two-fold; (1) to remove the sulfuric acid and hydrofluoric acid from the polymeric dispersion and (2) to remove the low molecular weight PTMEG fraction from the polymer by taking advantage of the high solubility of the low molecular weight species in water. Typically, the molecular weight distribution parameters of the polymer produced in the polymerization step are:

Dispersity = 2.0–2.1

MWR = 2.3–2.6

The molecular weight distribution of commercially salable regular PTMEG, however, are narrower than the polymer produced in the reactor:

Dispersity = 1.5–1.8

MWR = 1.95–2.07

In a conventional FSA catalyzed THF polymerization system, the low molecular weight (LMW) PTMEG fraction is washed out of the polymer. Generally a substantial amount of aqueous acidic effluent results from the PTMEG washing. U.S. Pat. No. 4,115,408 (Baker to Du Pont) provides a process for recovering the dissolved LMW PTMEG by converting it to tetrahydrofuran by a high temperature depolymerization process.

STEPS OF THE PROCESS

The process for narrowing the dispersity begins with a PTMEG product of broad molecular weight distribution resulting from the typical commercial manufacturing process described above using fluorosulfonic acid as polymerization catalyst.

This process for narrowing the molecular weight of PTMEG was first carried out in a laboratory single-stage glass short-path distillation unit similar to one of the stages as shown in the drawing. The unit "dosing chamber" was the feed reservoir for the PTMEG feed material. The desired temperature for distillation was maintained by the hot oil system at either 150° C., and the entire distillation path was maintained by the vacuum pump at 1.0 to 0.1 mbar. The PTMEG was distributed uniformly across a heated vertical surface into a thin film in the distillation column by means of a mechanical arm fitted with rollers or wipers turning at about 100 rmp. The evaporated low boiling fractions were condensed on the surface of an internal condenser and the condensate collected in the low boiler flask. The higher molecular weight PTMEG fractions from the heated film were collected in the high boiler flask. The polymer hold-up time in this unit was ten minutes. The PTMEG feed rate was approximately 1 mL/minute. The results of these tests are reported in Table 1.

Terathane (R) 1,000 is a commercial PTMEG having a nominal number average molecular weight of 1,000 and a Mw/Mn of 1.75. Terathane (R) 2,000 is a commercial PTMEG having a nominal number average molecular weight of 2,000 and a Mw/Mn of 1,85. PTMEG 250 is a commerically available PTMEG having a nominal number average molecular weight of 250 and a low Mw/Mn.

TABLE 1

Short-Path Distillation of PTMEG

|  | Mn | Mw/Mn | Calculated Mn | Pressure mbar | Hot Oil °C. |
|---|---|---|---|---|---|
| EXAMPLE 1 Distillation of TERATHANE(R) 1,000 | | | | | |
| PTMEG Feed | 1008 | 1.74 | | | |
| Distillate | 294 | | | 0.1 | 150 |
| Residue | 1055 | 1.70 | | 0.1 | 150 |
| EXAMPLE 2 6.5% of PTMEG 250 blended with TERATHANE(R) 1,000 | | | | | |
| PTMEG Feed | 863 | 1.91 | 830 | | |
| Distillate | 268 | | | 0.3 | 150 |
| Residue | 974 | 1.77 | | 0.3 | 150 |
| EXAMPLE 3 1.56% of PTMEG 250 blended with TERATHANE(R) 2,000 | | | | | |
| PTMEG Feed | 1802 | 2.075 | | | |
| Distillate | 261 | | | 0.3 | 150 |
| Residue | 2099 | 1.82 | | 0.3 | 150 |

The second series of short-path distillation of PTMEG samples was carried out using the apparatus shown in the Drawing, a pilot unit designed to produce higher feed rates. An excellent description of "Molecular and Short-path Distillation" by Klaus J. Erdweg appeared in Chemistry and Industry (London), 2 May 1983, pages 342-345. In these units, PTMEG feed rate is usually controlled at 8-10 Kg/hour. A sketch of the pilot unit used is depicted in the Drawing. The system used was a two-stage stainless steel (316) unit and the evaporator surface was 0.1 square meter/evaporator. The PTMEG feed was pumped into the first short-path evaporator where it was distributed into a thin film by means of a highly efficient self-cleaning roller wiper system available from UIC Inc., Joliet, Ill. The roller wiper system consisted of a wiper basket with an upper holding plate and stabilization rings, which were interconnected by the holders of the guide rods for the poly(tetrafluoroethylene) (PTFE) rollers. The PTMEG feed was flung by centrifugal force from the upper rotating distribution plate against the upper part of the evaporator surface. Follower rollers, made of glass-fiber-reinforced PTFE immediately spread the product to a film of uniform thickness. Rollers, supported on the guide rods with an extremely large clearance, were also pressed into the product film by centrifugal force. No product residue remained inside the rollers. Even small amounts of material were readily pressed out of the roller's interior by centrifugal force. Hence there were no product residues to cause thermal decomposition. The evaporated low molecular weight PTMEG condensed on the surface of an internal condenser without any noticeable decomposition and was collected in a condensate flask. An external cooling trap condensed any residual vapor that may have been present. Finally, any non-condensable constituents were aspirated by the three vacuum pumps—a vane pump, a Roots blower and a diffusion pump. Any one or all three pumps were used depending upon the vacuum desired. The high molecular weight species next flowed via a pressure barrier into the second short-path evaporator, and was there separated into distillate II, which was collected in a distillate receiver and residue. Results are reported in Table 2.

TABLE 2

Pilot Unit Distillation of PTMEG Samples
Feed PTMEG consisted of a blend of 6.5% (Mn = 250) with 93.5% (Mn = 982, MWR = 2.06) to five PTMEG (Mn = 818, MWR = 2.40, viscosity = 2.90 poise @ 40° C.). EXAMPLES 4,5,6 and 7 used a single stage KD-10 unit from UIC, Joliet, Illinois. The vacuum pump set for these examples consisted of a D16A vane pump on each stage. U-0094

|  | EXAMPLE 4 | EXAMPLE 5 | EXAMPLE 6 | EXAMPLE 7 |
|---|---|---|---|---|
| Feed Heat, | 51° C. | 53° C. | 56° C. | 57° C. |
| Feed Temp. | 49° C. | 51° C. | 55° C. | 57° C. |
| Evap.1 Temp. In | 172° C. | 178° C. | 178° C. | 184° C. |
| Evap.1 Temp.Out | 171° C. | 177° C. | 179° C. | 182° C. |
| Siphon Lock | 104° C. | 99° C. | 98° C. | 99° C. |
| Evap.2 Temp. In | 175° C. | 179° C. | 179° C. | 184° C. |
| Evap.2 Temp.Out | 174° C. | 178° C. | 178° C. | 183° C. |
| Condenser 1 | 41° C. | 42° C. | 40° C. | 41° C. |
| Condenser2 | 41° C. | 43.6° C. | 19° C. | 40° C. |
| Residue Temp. | 76° C. | 72° C. | 75° C. | 78° C. |
| Trap 1 Temp. | −29° C. | −36° C. | −35° C. | −37° C. |
| Trap 2 Temp. | −30° C. | −37° C. | −37° C. | −37° C. |
| Pressure 1 | 0.8 mbar | 0.4 mbar | 0.4 mbar | 0.4 mbar |
| Pressure 2 | 0.8 mbar | 0.05 mbar | 0.06 mbar | 0.1 mbar |
| Distillate 1 | 2.04% | 3.63% | 3.07% | 2.30% |
| Distillate 2 | 1.20% | 4.12 | 4.06 | 3.87 |
| Residue | 96.75% | 92.25 | 92.87 | 93.83 |
| Total Mass | 3589.30 g | 2948.40 g | 2403.60 g | 3325.20 g |
| Cut Time | 30 min. | 25 min. | 15 min. | 13 min. |
| Feed Time | 7.2 kg/hr. | 7.2 kg/hr. | 9.6 kg/hr. | 15.3 kg/hr |
| PTMEG FEED Mn | 982 | 982 | 982 | 982 |
| PTMEG FEED MWR | 2.40 | 2.40 | 2.40 | 2.40 |
| Distillate Mn | 356 | 269 | 267 | 269 |
| Distillate | 362 | 279 | 277 | 269 |

TABLE 2-continued

Pilot Unit Distillation of PTMEG Samples
Feed PTMEG consisted of a blend of 6.5% (Mn = 250)
with 93.5% (Mn = 982, MWR = 2.06) to five PTMEG
(Mn = 818, MWR = 2.40, viscosity = 2.90 poise @ 40° C.).
EXAMPLES 4,5,6 and 7 used a single stage KD-10 unit from
UIC, Joliet, Illinois. The vacuum pump set for these examples
consisted of a D16A vane pump on each stage.
U-0094

|  | EXAMPLE 4 | EXAMPLE 5 | EXAMPLE 6 | EXAMPLE 7 |
|---|---|---|---|---|
| MW Residue: |  |  |  |  |
| Mn | 933 | 1035 | 1014 | 989 |
| MWR | 2.13 | 1.97 | 2.00 | 2.05 |
| Dispersity | 1.76 | 1.68 | 1.70 | 1.72 |
| Water, ppm | <20 | <20 |  |  |
| OCE, ppm |  |  |  |  |

The feed and residues for this series of short path distillations were found to have the following linear oligomeric (2, 3, 4, 5) and cyclic oligomeric (C3, C4, and C5) ether contents by gas chromatography (GC). The oligomer content of commercial PTMEG "TERATHANE" Mn 1000 is given for comparison. These data are reported as area percent relative to an internal standard here and for the other EXAMPLES.

| Oligomer | PTMEG Mn 1000 | Feed | EXAMPLE 5 |
|---|---|---|---|
| 2 | 0.20 | 2.71 | Not detected |
| C3 | 0.03 | 0.05 | Not detected |
| 3 | 1.72 | 4.62 | 0.30 |
| C4 | 0.39 | 0.31 | 0.02 |
| 4 | 3.40 | 3.01 | 2.97 |
| C5 | 0.29 | 0.17 | 0.07 |
| 5 | 1.33 | 0.83 | 1.67 |

The feed material for EXAMPLES 8, 9 and 10 was the same as for EXAMPLES 5-8 above.

The data for these Examples were obtained on a single stage KD-10 unit.

The vacuum pump set for EXAMPLES 8, 9 AND 10 consisted of a WA-150 Roots Pump/D16A.

|  | EXAMPLE 8 | EXAMPLE 9 | EXAMPLE 10 |
|---|---|---|---|
| Feed Heat, | 49° C. | 49° C. | 49° C. |
| Feed Temp. | 42° C. | 42° C. | 45° C. |
| Evap.1 Temp. In | not applicable |  |  |
| Evap.1 Temp.Out | not applicable |  |  |
| Siphon Lock | not applicable |  |  |
| Evap.2 Temp. In | 180° C. | 191° C. | 199° C. |
| Evap.2 Temp.Out | 179° C. | 190° C. | 197° C. |
| Condenser 1 | not applicable |  |  |
| Condenser 2 | 40° C. | 40° C. | 41° C. |
| Residue Temp. | 71° C. | 72° C. | 76° C. |
| Trap 1 Temp. | not applicable |  |  |
| Trap 2 Temp. | −41° C. | −40° C. | −40° C. |
| Pressure 1 | not applicable |  |  |
| Pressure 2 | 0.04 mbar | 0.06 mbar | 0.08 mbar |
| Distillate 1 | not applicable |  |  |
| Distillate 2 | 8.85% | 7.88% | 6.87% |
| Residue | 91.15% | 92.12% | 93.13% |
| Total Mass | 765.90 g | 2492.60 g | 2687.40 g |
| Cut Time | 11 min. | 15 min. | 10 min. |
| Feed Rate | 4.2 kg/hr | 10.0 kg/hr. | 16.1 kg/hr. |
| PTMEG FEED Mn | 982 | 982 | 982 |
| PTMEG FEED MWR | 2.40 | 2.40 | 2.40 |
| Distillate Mn | 269 | 257 | 254 |
| Distillate MW | 284 | 268 | 264 |
| Residue: |  |  |  |
| Mn | 1076 | 1017 | 1001 |
| MWR | 1.97 | 2.04 | 2.04 |
| Dispersity | 1.70 | 1.71 | 1.73 |
| OCE, ppm |  |  |  |

The oligomer content of the feed and residue of EXAMPLE 8 follows:

| Oligomer | Feed | Residue |
|---|---|---|
| 2 | 2.71 | Not detected |
| C3 | 0.05 | Not detected |
| 3 | 4.62 | 0.07 |
| C4 | 0.31 | Not detected |
| 4 | 3.01 | 0.93 |
| C5 | 0.17 | Not detected |
| 5 | 0.83 | 1.16 |

The PTMEG feed for EXAMPLES 11 through 16 was a blend of 1.5% PTMEG 250 in 98.5% PTMEG 1800 to give PTMEG of Mn 1605 with a MWR of 2.19.

The vacuum pump set for EXAMPLES 11 through 13 consisted of a D16A vane pump on each stage.

The vacuum pump set for EXAMPLES 14 through 16 consisted of WA-150 Roots Pump/D16A on the single stage KD-10.

|  | EXAMPLE 11 | EXAMPLE 12 | EXAMPLE 13 |
|---|---|---|---|
| Feed Heat | 52° C. | 54° C. | 55° C. |
| Feed Temp. | 50° C. | 53° C. | 55° C. |
| Evap. 1 In | 179° C. | 184° C. | 189° C. |
| Evap. 1 Out | 171° C. | 177° C. | 179° C. |
| Siphon Lock | 103° C. | 107° C. | 116° C. |
| Evap. 2 In | 179° C. | 184° C. | 190° C. |
| Evap. 2 Out | 178° C. | 183° C. | 189° C. |
| Condenser 1 | 42° C. | 42° C. | 42° C. |
| Condenser 2 | 41° C. | 41° C. | 41° C. |
| Residue | 71° C. | 76° C. | 80° C. |
| Trap 1 | −34° C. | −33° C. | −33° C. |
| Trap 2 | −34° C. | −34° C. | −34° C. |
| Pressure 1 | 0.4 mbar | 0.4 | 0.5 |
| Pressure 2 | 0.05 mbar | 0.06 | 0.06 |
| Distillate 1 | 1.00% | 0.78 | 0.65 |
| Distillate 2 | 1.08% | 1.16 | 1.14 |
| Residue | 97.92% | 98.05 | 98.21 |
| Total Mass | 3011.10 g | 3133.80 | 2613.10 |
| Cut Time | 25 min. | 17 min. | 10 min. |
| Feed Rate | 7.2 kg/hr. | 11.1 | 15.79 |
| PTMEG FEED Mn | 1605 | 1605 | 1605 |
| PTMEG FEED MWR | 2.19 | 2.19 | 2.19 |
| Distillate 1 and 2 combined: |  |  |  |
| Mn | 355 | 273 | 258 |
| Dispersity | 1.38 | 1.08 | 1.05 |
| Residue |  |  |  |
| Mn | 1806 | 1804 | 1787 |
| Dispersity | 1.83 | 1.77 | 1.83 |
| MWR | 1.92 | 2.00 | 2.01 |
| Water, ppm | <20 |  |  |

|  | EXAMPLE 14 | EXAMPLE 15 | EXAMPLE 16 |
|---|---|---|---|
| Feed Heat | 49° C. | 49° C. | 49° C. |
| Feed Temp. | 38° C. | 38° C. | 38° C. |
| Evap. 1 In |  | not applicable |  |
| Evap 1 Out |  | not applicable |  |

-continued

| | | | |
|---|---|---|---|
| Siphon Lock | not applicable | | |
| Evap. 2 In | 205° C. | 215° C. | 225° C. |
| Evap. 2 Out | 203° C. | 214° C. | 223° C. |
| Condenser 1 | not applicable | | |
| Condenser 2 | 41° C. | 40° C. | 40° C. |
| Residue | 71° C. | 76° C. | 80° C. |
| Trap 1 | not applicable | | |
| Trap 2 | −39° C. | −40° C. | −39° C. |
| Pressure 1 | not applicable | | |
| Pressure 2 | 0.15 mbar | 0.09 | 0.09 |
| Distillate 1 | not applicable | | |
| Distillate 2 | 2.06% | 2.85% | 2.53% |
| Residue | 97.94% | 97.15% | 97.47% |
| Total Mass | 912.00 g | 1625.70 g | 2359.00 g |
| Cut Time | 11 min. | 10 min. | 10 min. |
| Feed Rate | 5.0 kg/hr | 9.8 kg/hr | 14.2 kg/hr |
| PTMEG FEED Mn | | 1605 | 1605 |
| PTMEG FEED MWR | | 2.19 | 2.19 |
| Distillate: | | | |
| Mn | | 254 | 259 |
| Dispersity | | 1.05 | 1.06 |
| Residue: | | | |
| Mn | | 1864 | 1864 |
| MWR | | 1.93 | 1.94 |
| Dispersity | | 1.76 | 1.76 |
| Water, ppm | | | |

The content of low molecular weight linear and cyclic oligomers in the feed and the residues of EXAMPLE 15 and EXAMPLE 16 follow.

| Oligomer | Feed | EXAMPLE 15 | EXAMPLE 16 |
|---|---|---|---|
| 2 | 0.99 | Not detected | Not detected |
| C3 | 0.07 | Not detected | Not detected |
| 3 | 2.02 | 0.11 | 0.17 |
| C4 | 0.52 | Not detected | Not detected |
| 4 | 0.86 | 0.14 | 0.18 |
| C5 | 0.26 | Not detected | Not detected |
| 5 | 0.26 | 0.13 | 0.14 |

The merits offered by commercial applications of the short-path distillation are varied. Mn 1600 residue from the first example by short-path distillation can yield Mn 250 as a distillate and excellent Mn 1800 residue. Another variation is to make Mn 800 material in the reactor and use short-path distillation to give a Mn 250 distillate and a residue of Mn 1000 grade.

We claim:

1. A separation process consisting essentially of feeding poly(tetramethylene ether) glycol having a dispersity of 1.9 to 2.3 to at least one short-path distillation apparati each of which has at least one mechanically wiped cylindrical evaporator surface, providing a film of poly(tetramethylene ether) glycol on said evaporator surface, maintaining said evaporator surface at 140° to 190° C. and a pressure of 0.001 to 1.0 millibar, condensing evaporated material on an internal condenser mounted inside said cylindrical evaporator and recovering unevaporated poly(tetramethylene ether) glycol having a reduced molecular weight ratio of 1.9 to 2.07 and a dispersity of 1.2 to 1.8.

2. The process of claim 1 wherein the poly(tetramethylene ether) glycol being fed to the short-path distillation apparati has a number average molecular weight of from 400 to 4,000.

3. The process of claim 2 wherein the molecular weight ratio of the poly(tetramethylene ether) glycol being fed to the short-path distillation apparati is from 2.0 to 2.6.

4. The process of claim 3 wherein the short-path distillation apparati has two or more serially connected evaporator surfaces.

5. The process of claim 4 wherein the evaporative pressure in the final short-path distillation apparati is from 0.001 to 0.01 mbar.

* * * * *